United States Patent [19]
Karch

[11] Patent Number: 5,899,991
[45] Date of Patent: May 4, 1999

[54] MODELING TECHNIQUE FOR SYSTEM ACCESS CONTROL AND MANAGEMENT

[75] Inventor: Robert Karch, Westfield, N.J.

[73] Assignee: Teleran Technologies, L.P.

[21] Appl. No.: 08/857,837

[22] Filed: May 12, 1997

Related U.S. Application Data

[63] Continuation-in-part of application No. 08/855,426, May 13, 1997, abandoned.

[51] Int. Cl.$^6$ ..................................................... G06F 17/30
[52] U.S. Cl. ..................... 707/5; 707/1; 707/2; 707/10
[58] Field of Search .................................. 707/1, 2, 5, 10

[56] References Cited

U.S. PATENT DOCUMENTS

| | | | |
|---|---|---|---|
| 5,412,806 | 5/1995 | Du et al. ..................................... | 707/2 |
| 5,544,355 | 8/1996 | Chaudhuri et al. ......................... | 707/2 |
| 5,546,576 | 8/1996 | Cochrane et al. ........................... | 707/2 |
| 5,590,322 | 12/1996 | Harding et al. ............................. | 707/4 |
| 5,600,831 | 2/1997 | Levy et al. .................................. | 707/2 |
| 5,724,569 | 3/1998 | Andres ........................................ | 707/2 |

*Primary Examiner*—Thomas G. Black
*Assistant Examiner*—Donald Min
*Attorney, Agent, or Firm*—Kaplan & Gilman, LLP

[57] ABSTRACT

An access and control system for use in a computer network provides for a rule making algorithm which models a database in advance and prevents queries which could result in exceptional processing requirements. As queries are entered during the life of the system, a learning algorithm updates the rules. The rules may be applied at the point of entry as well as the database.

25 Claims, 4 Drawing Sheets

MODELING TECHNIQUE FOR SYSTEM ACCESS CONTROL AND MANAGEMENT

This application is a continuation-in-part under rule 1.62 of application Ser. No. 08/855,426 filed on May. 13, 1997, and entitled Improved Modelling Technique for System Access Control and Management in the name of inventor Robert Karch, abandoned.

TECHNICAL FIELD

This invention relates to system access control and management, and more particularly, to an improved technique of utilizing system modeling in order to accurately control activities executed by a system, as well as to preclude users of said system from taking actions (e.g. entering data or queries) which have an adverse impact upon the system and the other users.

DESCRIPTION OF THE PRIOR ART

Since the beginning of multi-user computer systems, access management and control has been a key issue required to be resolved for such systems. For example, in the network computing environment, distributed systems allow access by a large number of users to a large number of different databases which may be located on different machines. Recently, with the rapid growth of internet technology, literally millions of users have access to databases located all over the world.

One basic technique of access control involves authentication. For example, one of the simplest authentication schemes requires a user to enter a password before permitting access to certain files. This secures the database to some extent, so that unauthorized users do not have access to certain data.

Another issue of importance involves situations wherein users of the network attempt to access data in a manner that could potentially lock up the entire system, or could result in tremendous amounts of processing power being utilized. Many times, these users cause the problem by inadvertently entering incorrect requests for activities (e.g.; queries); or by intentionally entering queries which, unknown to the user in advance, cause tremendous overloading of the system being utilized.

For purposes of explanation herein, and not by way of limitation, we utilize the example of a distributed computer system located at various nodes of a network, such as the internet. Typically, a user utilizes a local personal computer with some access software for accessing and manipulating the data. The software used at the personal computer usually contains no capability to police the transactions being requested by the user.

Data queries are entered in order to retrieve and access data records. Data queries are often entered in a high level language such as SQL. A typical exemplary query might be: SELECT LNAME, ADDRESS FROM BIGTABLE WHERE (BIRTHYEAR>1960), which would retrieve the last names and addresses of all personnel who were born after 1960.

It can be readily appreciated that in such systems, database queries can cause tremendous loading of the system which can result in other users being unable to properly utilize the system resources. For example, consider a database containing the social security numbers of all residents of the State of New York. If a user is looking for a list of the social security numbers of residents of New York City over the age of 90, but inadvertently entered the query to locate all social security numbers of residents in New York State under the age of 90, the query would result in millions upon millions of data records being located and transported from the database down to the local personal computer being utilized by the user. This results in the database and communication resources being loaded so heavily that other users will see a either tremendous degradation in, or a total failure of, the performance of the system.

Some database searching systems include techniques for limiting the result to a predetermined level of system loading. For example, the WestLaw database utilized for legal research is one example of such an arrangement. In the WestLaw system, if a query is entered and the number of records located exceeds a predetermined maximum, the search is stopped and the user notified that the predetermined number of records has been exceeded. The user is then given an option to continue with the search.

One problem with such an arrangement is that the system is reactive. Specifically, the predetermined number of records are located and processed before the system realizes that there is a problem with the requested search query. Accordingly, resources are wasted. Additionally, the system includes no ability to change based upon the changing data and/or queries. Accordingly, if the same problematic search query is entered five times in a row, the same waste of transaction time will occur and the same predetermined number of records will be processed all five times. The system never realizes that there is a problem.

Recently, systems have become available which are "rule based" and which can adapt and modify the rules based upon previous results. For example, one such system, known as SmartMode, tracks system activities and replaces the rules governing database access as it is determined that the rules are unacceptable. Specifically, and continuing to utilize the database query example set forth above, the SmartMode system is shown conceptually in FIG. 1. The arrangement of FIG. 1 includes a personal computer 101 arranged to communicate over an arbitrary network 102 with a central computer 103. The central computer 103 contains a database 104 of records which may be accessed by personal computer 101, or by any number of other computing devices which may be connected to network 102.

Also shown is a query monitor 107, a rule engine 106, and induction processing 105. These items work together in the manner described hereafter to facilitate system learning during operation.

Rule engine 106 is a rule based system which reads each of the queries incoming in and determines which queries generate an unacceptably large number of responses and thus load the system beyond tolerance. The rules of rule engine 106 are replaced, and thus new rules are derived, in accordance with the results achieved by the induction process 105 using the history of queries as logged by query monitor 107.

For example, consider a query entered into personal computer 101 which requests access to and downloading of all records where the residence field is New York State. Query monitor 107 monitors such a query as well as the fact that such a query resulted in millions of database records being located and downloaded to personal computer 101. Accordingly, the rules of rule engine 106 are replaced by a set of rules which prohibit such queries in the future based upon the induction process 105.

Typically, induction process 105 is arranged such that any query resulting in excessive resource loading will cause a rule change prohibiting such queries in the future. Importantly however, unless and until there is a history of transactions, no set of rules is in place. This means that the system must demonstrate poor performance before it can learn how to police itself.

The foregoing system solves some of the drawbacks of the prior art but leaves its own problems. First, induction process 105 must first permit the system to engage in numerous improper transactions before it can learn enough to change its rules in order to prohibit such transactions. Second, the processing required to continually update the induction process is itself not very simplistic, and results in a major load being placed on the central computer 103 storing the database. Third, the induction process requires both acceptable and problematic queries in order to make rules that avoid the problematic transactions. Since storage is limited, only the last N transactions are accounted for when utilizing induction process 105. To the extent that the last N transactions do not accurately reflect the results of both problematic and acceptable queries, the set of rules is improperly replaced. While such a system could utilize all previous transactions in updating the rules, this would result in resources being entirely consumed. Accordingly, only a limited, and often statistically inaccurate, sample space is used.

Consider a hypothetical database 104 which includes typical telephone calling patterns for various residents for a particular two day period. If certain queries generate too many responses, the rules will be changed. However, the induction process 105 may not be programmed to account for the fact that one of the days may, for example, be Thanksgiving Day or Mothers Day where calling patterns typically increase greatly.

In general then, one problem with the prior art system described heretofore is that the induction process 105 fails to account for the fact that the learning process is based upon a limited statistical sample of system activity, which sample may be statistically inaccurate. This results in the wrong rules being built into rule engine 106, which further requires numerous transactions before induction process 105 can learn that the rules are wrong and must be corrected. Additionally, there is no system known which can prevent the problems before they occur.

In view of the above, as well as the fact that there are millions of databases with billions of records installed on many large networks, it can be appreciated that there exists a need in the art for an access and control mechanism which provides a technique to avoid queries and other system access from entirely overloading the system resources, while at the same time avoids the problems of overloading the system in order for the induction logic to learn what to do so that it does not overload the system.

SUMMARY OF THE INVENTION

The above and other problems of the prior art are overcome and a technical advance is achieved in accordance with the present invention which relates to a novel system for utilizing expert systems technology to model, in advance of any system activity by a user, the results which will be generated by such activity (e.g. the number of records located for a particular query). In accordance with the invention, attributes of the system are utilized in advance in order to provide a set of rules to block certain queries. The rules are formulated prior to any queries being sent to the central database and are updated as queries are processed. Accordingly, the system does not require problems Thus, the system uses predefined rules in order to prevent problems before they arise. By predicting the response of the system based upon a model thereof, so called "bad" transactions are avoided to arise before it can figure out how to solve such problems. Thus, the system uses predefined rules in order to prevent problems from arising. By predicting the response of the system based upon a model thereof, so called "bad" transactions are avoided.

In an additional embodiment, the rules can be applied at the point of entry, the local PC or NC terminal, as well as at the central database implementing administration. By distributing the rules governing access and control of the system, the processing and communications resources present in the system are not overloaded by incorrect queries. Additionally, the processing application of the rules is preferably done at the personal computer or network computer device.

Various other embodiments include numerous enhancements to be described in further detail later herein. One such enhancement includes the concept of allowing the induction logic to update the rules by not only learning from transactions which occur, but by allowing human intervention to examine the newly updated rules and change or delete one or more such rules. For example, the operator may realize that certain rules are being created as a result of a statistical bias present in the data, and may change the rules in order to correct the statistical bias.

In a further embodiment, several rules which potentially conflict with one another are maintained to govern a certain transaction. As operation of the system progresses, the rules are increased and/or decreased in weight, with such change of weight occurring preferably on a dynamic and periodic schedule. When a transaction requiring application of the rules is to be processed, the system examines the potentially conflicting rules and utilizes a weighted average to determine when the transaction should be allowed. In this manner, dynamically changing conditions are accounted for, rather than simply discarding the old rule as in prior art systems.

In a still further enhanced embodiment, the database attributes are read in advance, and information regarding the context of such database (i.e. the actual meaning of the particular items in the database) is utilized to assist in the formulation of the rules of access and/or control.

In still another enhanced embodiment of the invention, the induction logic formulates rules, and a rule filter is implemented which is context sensitive and eliminates rules which the rule filter determines are improper.

The foregoing techniques provide a system which uses an arrangement of rules to avoid problematic queries and maintain control of and access to the database as necessary. While the invention has been described with respect to database queries and access, and this example will be used throughout this application for explanatory purposes, it is understood that other environments may benefit from application of the techniques described and claimed hereafter.

DETAILED DESCRIPTION OF THE PREFERRED EMBODIMENT

Figure 1:
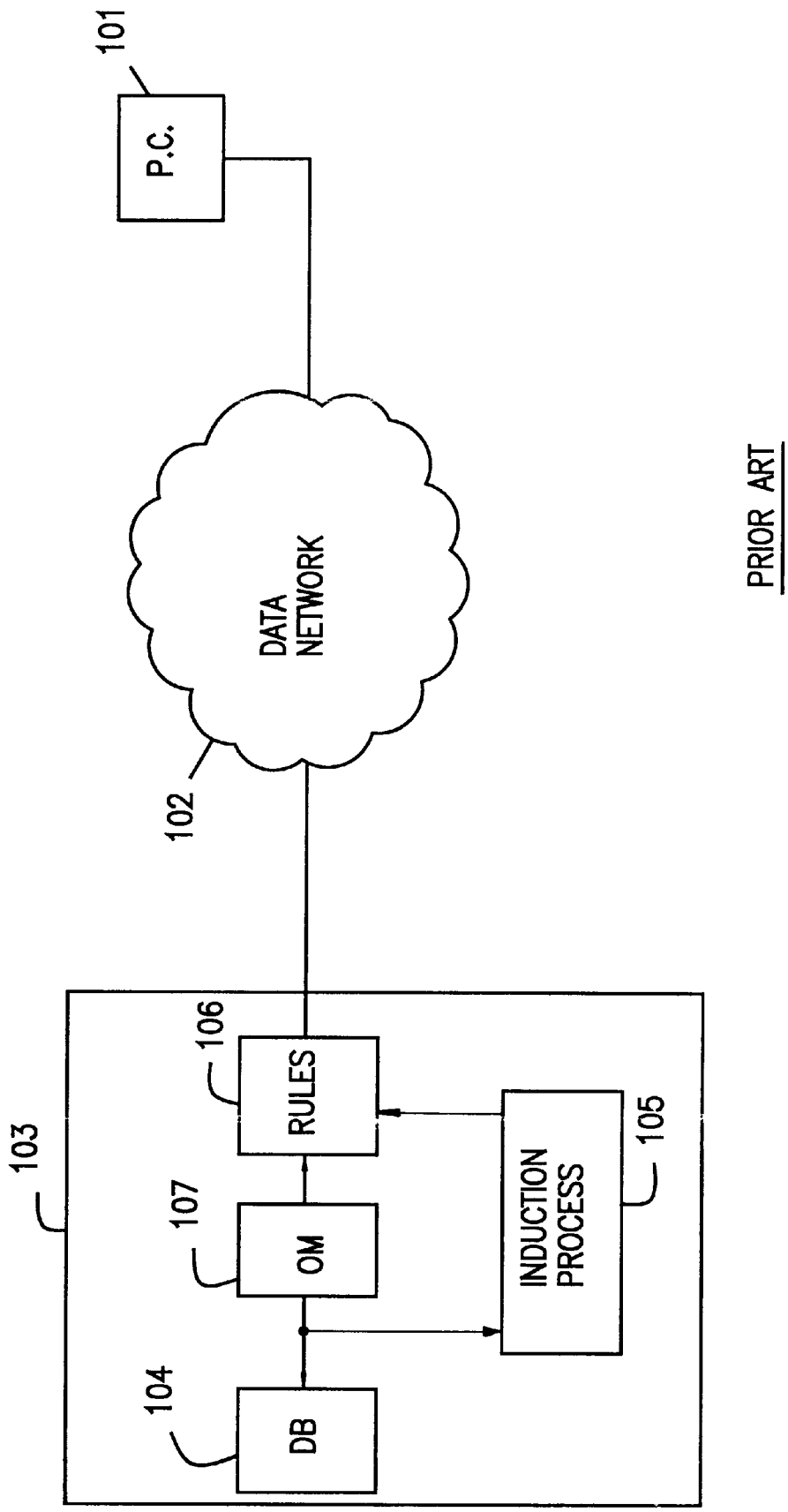
FIG. 1 shows a prior art rule based system for detecting the problematic queries to a database and preventing future such queries.
Figure 2:
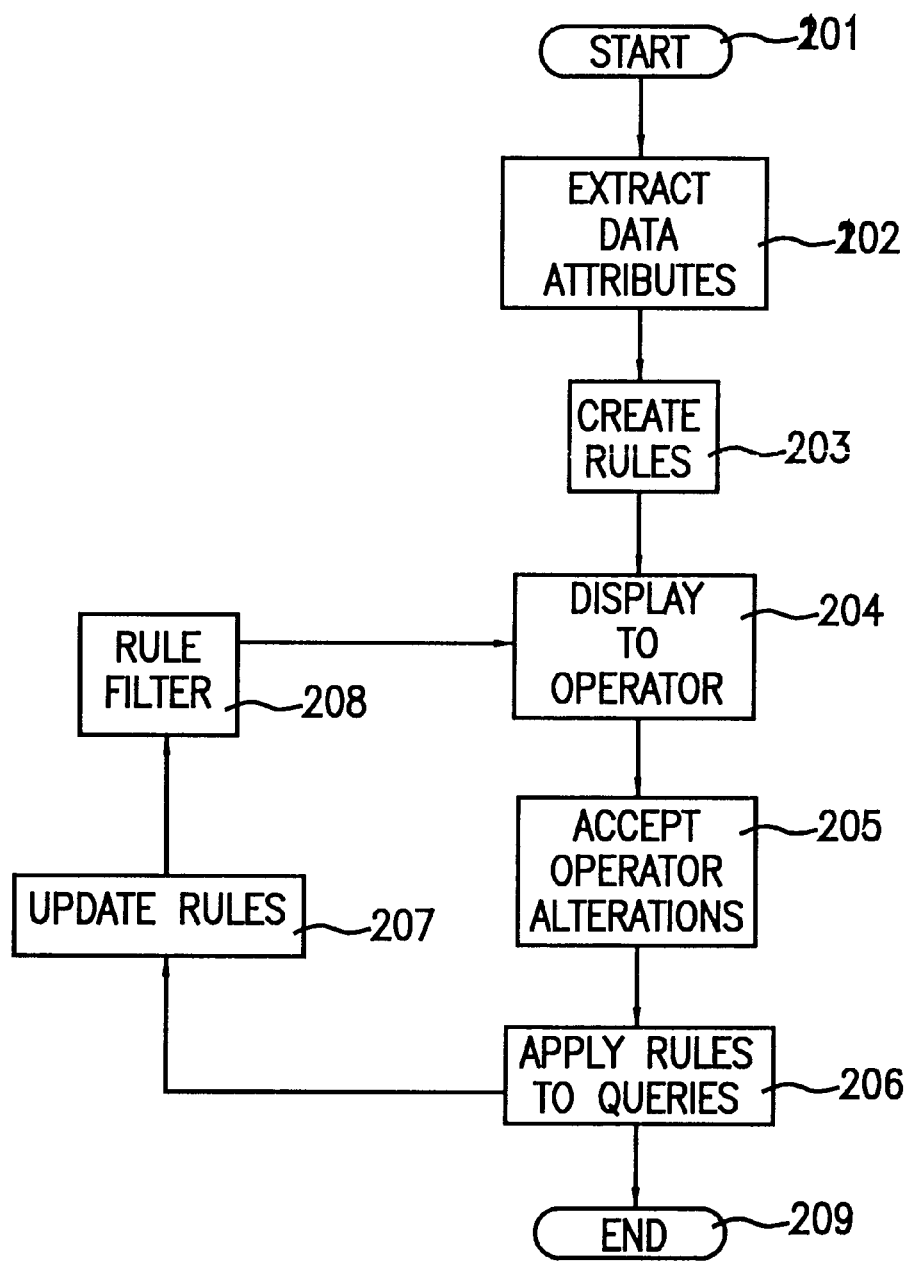
FIG. 2 shows a basic flow chart of a system which could be implemented at a PC or NC in order to employ the techniques of the present invention.

FIG. 2 shows a high level flow chart of the techniques of the present invention. The arrangement of FIG. 2 may be employed at a central database, a server, or a personal computer, and may even be implemented in what has recently become known as an NC, a special purpose network access device which is similar to a stripped down basic PC. All of the foregoing types of computers are well known to those of ordinary skill in this art that will not be described in any further detail. A terminal can include any of the foregoing types of devices.

The flow chart is entered at the start 201 where data attributes are extracted from the database 202 and/or the data dictionary associated with the database. Typical items which might be extracted from the subject database include items such as data clustering, which databases are joined, frequency of a particular value in a particular field, record length, the indexing structure of the database, and many other items. The rule algorithm 203 is programmed with information regarding which attributes are being extracted from the database at block 202 and forwarded to the create rules algorithm 203. Thus, for example, if the create rules block 203 receives information from extract data attributes block 202 indicating that a particular field has a particular value X for nine million of ten million database records, then the create rules block 203 creates a rule not permitting queries which attempt to filter the number of selected rows only using X in the particular subject field. (i.e.; a query clause including the syntax WHERE (SUBFLD=X) would require additional filter conditions).

The algorithm for creating and updating rules may also recognize characteristics of bad queries other than too many records being retrieved. Other items which may be checked are (i) CPU processing time, (ii) bandwidth, (iii) elapsed time of the query and (iv) any combination thereof. The combinations may also be a weighted average.

Another common example of how create rules block 203 could be implemented in order to prevent excessive database loading would be with regard to database joining. Specifically, databases may be joined in a one to many relationship such that a first database includes, for example, one hundred records, but each of the one hundred records corresponds to ten thousand records in a second database. Under such circumstances, if a user entered a query which resulted in ten records from the first database being located, such query would also result in one hundred thousand records from the second database being processed and transmitted. Accordingly, under such circumstances, create rules block 203 would create a rule indicating that when the one to many joining relationship is utilized, other conditions must be specified so the records processed from the second database do not reach numbers beyond the system loading capability.

In addition to the foregoing, the rules created by the create rule algorithm 203 may be displayed in textual or other format to an operator directly on the personal computer or other local device running the software. Control is then transferred to block 205 where the operator is given the option to alter certain rules set forth by the create rules block 203. Examples of such operator interaction might be to (i) override the maximum allowable number of retrieved records, (ii) delete certain rules which the operator is aware would prevent necessary (though high resource) work from being done; or (iii) any other modification to rules created by the create rules block 203. Thereafter, a set of rules is stored and utilized to operate on queries prior to any queries being processed.

At operational block 206, the queries are processed and the rules are updated in accordance with the techniques to be described hereafter. Importantly, the update rule block 207, while it may replace the old rules with new ones, also supplements the old rules, and/or weights different sets of rules as further described hereafter. A rule filter 208 discards certain rules which are known to the system to be unfounded, and the operator is then given a chance to finally edit the rules as previously described.

Figure 3:
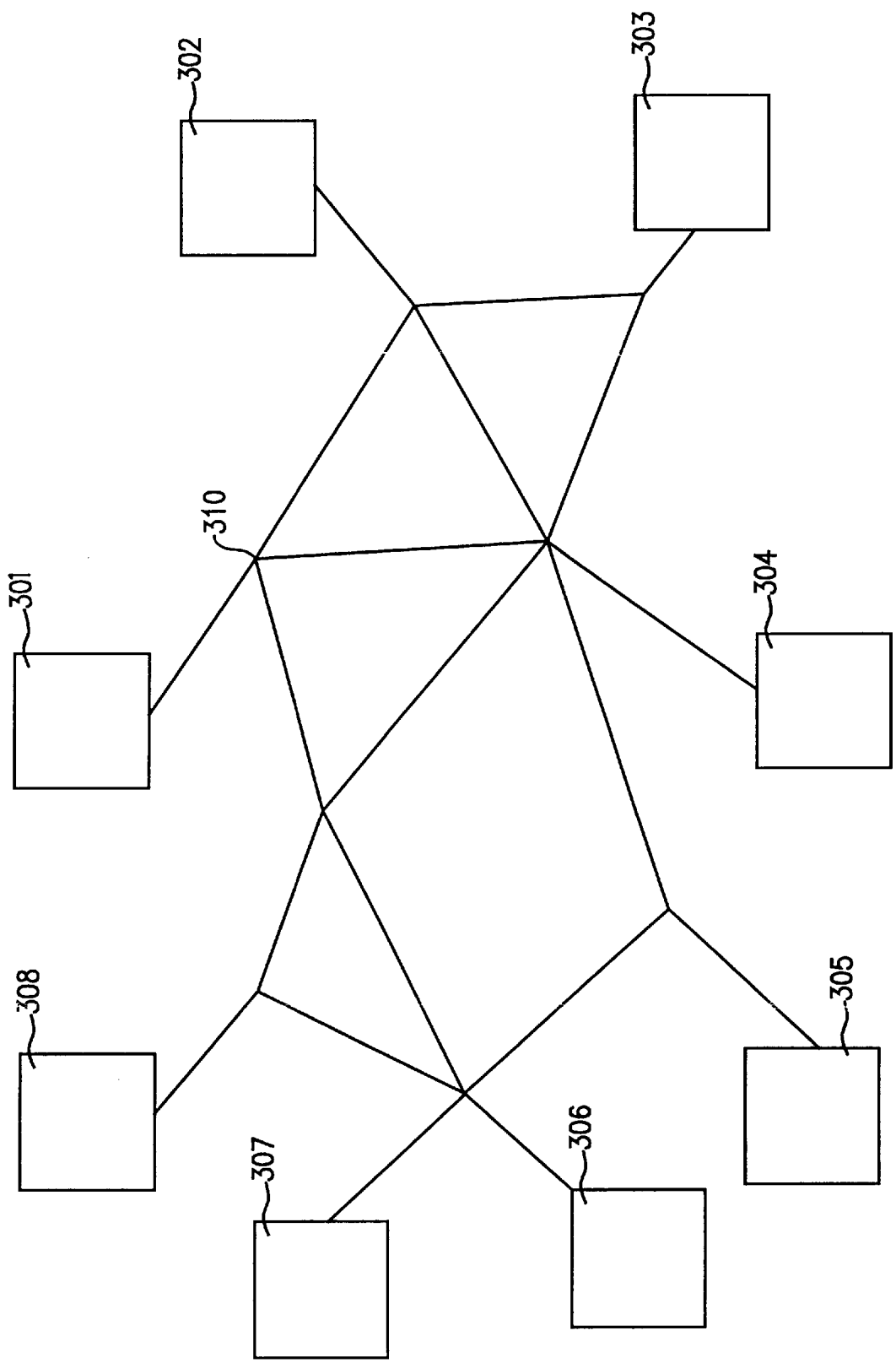
FIG. 3 shows an exemplary network including a plurality of computers which may access data from one.

FIG. 3 depicts an exemplary computer network 310 connected to which are a plurality of computing devices 301 through 308. The computing devices 301 through 308 may be personal computers, NC devices, telephones, or any type of device capable of implementing the network protocol and thus communicating with other servers or computers over network 310. Each of the computing devices 301 through 308 includes software sufficient to implement the techniques described herein. Accordingly, searching which would otherwise cause heavy traffic and/or system overloading upon other computers is eliminated, and/or controlled at the point of entry into the network, rather than at a host computer upon which the database being searched is resident. This results in improved resource performance.

As a particular example of both the foregoing as well as some enhanced techniques provided for herein, we consider a case of a database query wherein a database is that of a governmental agency regarding tax returns. The database would contain information such as the name, address, and social security number of every resident of a particular state or country, as well as detailed information concerning any tax related documents ever filed by the individual or business entity. Such a database might be searchable by various governmental and/or law enforcement agencies which can be located all over the country. Clearly in such circumstances it would be desirable to avoid having inexperienced users interacting with the communications network connecting the user and the database, as well as the database itself, in a manner which would substantially delay use of the database or network by other users.

In one particular innovation of the present invention, the created rules are displayed in readable form to an operator, who is given the chance to interact with the rules and/or alter such rules. Thus, for example, consider a query wherein a user requests information concerning every tax form filed by everyone in the database for the entire year. Presuming that the system has been operational for quite some time and has reached the point of stability, there would be a rule prohibiting such a query.

If the foregoing query were entered on January 1 at 8 a.m., there would likely be only a small number of records in the database reflecting tax payers who have filed any tax documents in the few hours since the year began. Accordingly, the user may be given permission to override the rule created by the system, since the system is creating rules based upon transactions occurring at any random time, and would not account for the fact that on January 1 at 8 a.m., a very small number of tax payers have filed documents for the present year. In accordance with the techniques of the present invention, the rule generated by the computer system would be displayed to the operator and the operator given the opportunity to alter that rule, perhaps only temporarily in order to facilitate the requested query. The operator may account for time sensitivity, as well as any other fact which may not be accounted for in the rule algorithm.

The above example is that of a system which has defined its rules based on a statistically accurate sample (i.e.; queries which occur all year long) but wherein the particular query desired is that of a specific abnormal case (i.e.; the first few hours of the year). The inventive technique, by allowing users to interact with the rules formed by the database, also allows for the reverse of the foregoing situation. Specifically, the technique also provides that when the rule algorithm generates rules based upon a particular abnormal case (i.e.; a statistical sample which is incorrectly biased) the operator may override the rules by accounting for the entire sample space and removing the statistical bias.

As an example of the foregoing, consider that the technique generates rules based upon the most recent window of history of queries. Thus, periodically after N queries, the rules are updated and/or altered on a running basis, as shown in FIG. 2 at blocks 206 through 208. As can be appreciated from FIG. 2, the rule system is in effect learning from experience as queries are processed and ultimately result in unacceptable results.

Consider the situation wherein the rules are updated after every two days of database queries and are adjusted so that they reflect the past two days of queries. Typically, if a user requests information on individuals from a particular state that have filed a tax return within the two day period, this will be a manageable query which would normally not result in any rule changes. However, if the date upon which the query is issued happens to be April 16 or 17 the two days immediately subsequent to the deadline for filing income tax returns, then the same query would result in a tremendous loading of resources, and a rule change wherein a future request asking for this information would no longer be allowed.

The foregoing rule change would of course be incorrect, as the query should in fact be allowed almost everyday of the year. Accordingly, by presenting the rule generated by the computer in response to the query to the operator, and allowing the operator to make a determination regarding whether or not the rule has been incorrectly statistically biased (i.e.; April 15 does not represent the average day), the operator can override and/or alter the rule so that it becomes permissible to request data regarding all tax items for a particular day.

The foregoing two examples of human intervention to override the rules generated by the computer provide that when the computer generates rules which are statistically biased, the operator may correct such statistical bias and when the computer generates rules which are not statistically biased, the operator may "correct" the rules to account for statistical biases which should be present. Accordingly, the two situations are, in some sense, inverse.

Each time the query is disallowed as violating the rules, a record is made of such query and the fact that it is disallowed. A list of disallowed queries, and the reason for the query being disallowed, is displayed to the operator for possible override. If the operator is aware of the fact that the database or data contained therein has been sufficiently changed such that the query will no longer result in excessive system resources being utilized, then the operator may override the rules.

Additionally, not only does the system learn from the particular queries taking place in that when a query generates unacceptable results the rules are updated, but the system also learns from the database and data contained therein being changed as well. Specifically, as previously stated, the database may be modeled in advance in any transactions occurring. The exact process of modeling such database may be repeated at periodic intervals. The intervals may be spaced at fixed durations of time, fixed number of transactions, or, after particular events such as particular queries which are allowed to proceed but nonetheless cause system overloading.

By remodelling the database periodically, the system can account for the fact queries which were previously deemed unacceptable may be acceptable due to changes in data. Additionally, rules which allowed certain queries could be changed to not allow the queries if the changes in data are such that the queries would cause unacceptable results. Accordingly, as data changes, the system can remodel the database, and update the rules if necessary.

The arrangement also contemplates a context sensitive rule filter which receives the output of the rule making algorithm indicating conceptually at 203 and 207 of FIG. 2, but which utilizes information about the context of queries and the database in order to eliminate bad rules. Specifically, presuming the rule making algorithm is based largely upon induction, there are situations where the rule making algorithm would create a rule which is correct as a matter of logic and induction, but which, based upon reasons external to the induction algorithm, is incorrect. These rules should be eliminated as represented conceptually at block 208 of FIG. 2.

As an example of the foregoing, consider a situation where the following three queries have been received:
 (i) Select FNAME, LNAME, SSN, from BIGTABLE where SSN>0.
 (ii) Select FNAME, LNAME, SSN, from BIGTABLE where SSN<0.
 (iii) Select FNAME, LNAME, SSN, MILITARY_STATUS from BIGTABLE.

It can be appreciated that query (i) is resource intensive, returning a large number of rows, while query (ii) is not resource intensive at all and returns nothing. Query (iii) would return every row in the entire database. When the induction process analyzes the above queries, it notices that query (iii) does not have a WHERE clause. However, since query (i) does have a WHERE clause, and also returns an unmanageably large number of rows, the induction process can not conclude that the presence of a WHERE clause would limit the amount of data returned. Rather, the only thing which is significantly different between query (iii) and the other queries is that the MILITARY_STATUS field is requested in query (iii). Accordingly, the induction process would conclude, incorrectly, that the presence of MILITARY_STATUS results in a large number of rows being returned.

The present invention contemplates a rule filter which is programmed such that bad rules should be eliminated. Since the presence of any selected column on its own does not automatically imply an unmanageable query, the rule is deemed bad. In short, the induction process at block 207 has been fooled into thinking the MILITARY_STATUS field was the problem, when in fact the problem was lack of a proper WHERE clause.

Thus, the rule filter can be programmed to review rules generated, by the rule making induction algorithm 207, and to discard such rules when they are clearly inappropriate. The rule filter, in discarding such rules, can utilize knowledge programmed to it regarding the context of particular queries.

The arrangement also contemplates a weighted average of numerous rules which may prevent or allow a particular query. The rules can be ranked in terms of importance. Thus, the query is analyzed for numerous items, and the presence or absence of each of a plurality of items is given a weight. A weighted average is then calculated, and the query is allowed if the weighted average is above a particular amount.

In another embodiment, the rules are formulated based upon the time relationship of events. This embodiment is specifically suitable for prohibiting events which could be security breaches. For example, consider a user who enters queries from a Los Angeles location. If queries are received from the same user one hour later from a New York location, then one set of the queries is very likely fraudulent. Accordingly, the rules would be changed to prohibit queries from that particular user until the potential security breach is eliminated. Thus, by comparing both the substance and the time relationship of the queries, rules are formed. This technique can be used in conjunction with the other methods taught herein.

Figure 4:
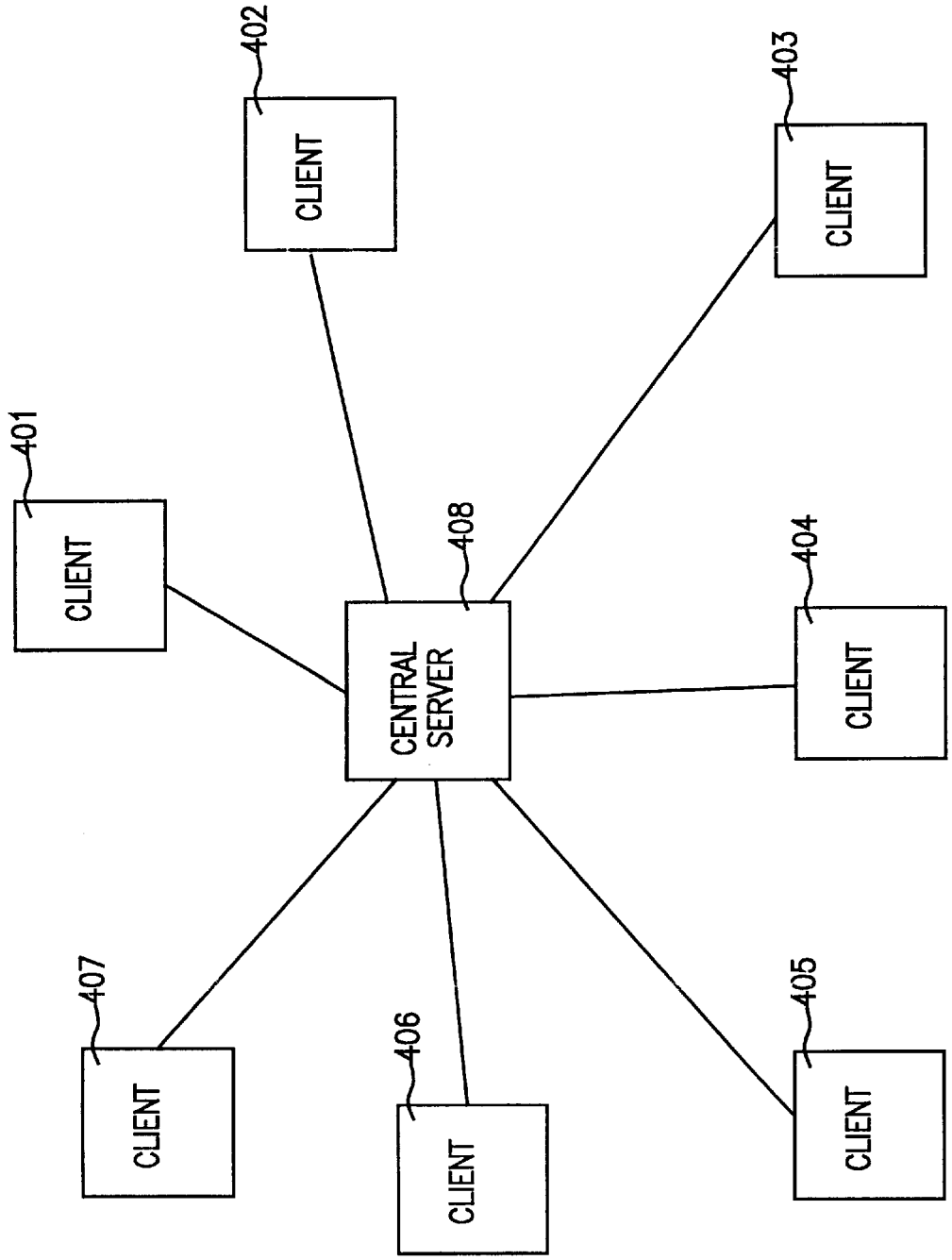
FIG. 4 shows a conceptional diagram of an additional embodiment of the invention.

FIG. 4 shows a conceptual diagram of a plurality of client nodes 401 through 407, all connected to a central server 408. The central server 408 and nodes 401–407 may each be any type of computing device such as a thin client, personal computer, workstation, etc. While the connections between the clients and central server 408 are shown as "point to point," it can be appreciated that such connections in actuality may be effectuated via any network, (e.g.; the Internet), or via a combination of different communications channels.

In operation, clients process objects by presenting such objects to a rules engine which evaluates such objects. After the rules are fired, the results are then used to update the rules in accordance with the techniques previously described herein. In the embodiment under consideration, the rules are updated in central server 408 and conveyed to one or more of the clients after such updating. The objects upon which such rules operate are, in this example, database queries.

The central server 408 contains the induction logic (e.g.; a learning engine) required to take the results of the rules and formulate new rules. The learning engine in the central server 408 receives information from the numerous clients 401–407 regarding the application of the rules at the clients 401–407 to different queries. Thus, the rules are generated and updated based upon a larger statistical sample then is present at any client.

The information received at central server 408 from clients 401–407 is termed herein samples, where each sample preferably represents the application of rules to a particular object (e.g.; a database query). Specifically, each sample preferably conveys to central server 408: (i) the values of the attributes of each object upon which rules were fired by the client, (ii) the rules fired and (iii) the results of those rules. The samples are received by the central server 408, after which the central server performs the induction required to update the rules. The particular induction process utilized at central server 408 may be any of a variety of well known such induction processes (i.e.; learning algorithms) and the particular one utilized is not critical to the present invention. Moreover, existing rules may be updated or new rules generated to supplement or replace existing rules.

After central server 408 updates the rules, the newly updated rules are transmitted to each of clients 401 through 407. In other embodiments, the updated rules may be transmitted only to clients which are known to operate upon the objects to which the updated rules pertain. Additionally, it is also preferred that any client 401 through 407 which submits samples to central server 408, must also accept updated rules regarding the objects contained in such samples. This requirement ensures that all of the rules are appropriately updated based upon all of the sample activity of all of the clients operating on a particular type of object.

At central server 408, all samples may be stored in sequential order. When it is desirable to update rules which govern a particular object type, all such samples involving such object type may be utilized in formulating such rules.

Additionally, it may be desirable to facilitate the automatic transmission of samples from clients to central server 408 at periodic intervals, or immediately upon the generation of such samples. The rule updating at central server 408 may occur at the same frequency or at different frequencies as the transmission of samples from clients 401–408.

The foregoing represents the preferred embodiment of the invention but has understood that various other modifications and/or additions may be implemented by those of ordinary skill in this art. Such modifications are intended to be covered by the claims appended hereto.

What is claimed is:

1. A method of controlling system access comprising the steps of:

providing a plurality of terminals for a plurality of users to access said system;

modeling said system in advance of any users accessing said system;

said modeling accepting as input parameters derived from said system to be accessed;

determining, in response to said step of modeling, which particular types of system access will result in degraded system performance; and preventing such types of system access.

2. The method of claim 1 further comprising the steps of:

storing, in response to said step of determining, a set of rules indicative of which types of system access will be permitted and which types of system access will not be permitted;

examining a particular type of system access requested;

concluding, based upon said stored rules, that a particular system access should be prevented; and recording said particular type of system access to be prevented.

3. The method of claim 2 wherein said prevented type of system access or said stored rules are displayed to an operator.

4. The method of claims 1, 2, or 3 wherein system access generates a result, and wherein said result is examined to determine whether said result causes too many of a plurality of database records to be retrieved.

5. The method of claim 1, 2, or 3 wherein said rules are implemented at said terminal.

6. The method of claim 2 wherein said rules are updated periodically.

7. The method of claim 6 wherein transactions causing excessive system loading results in said rules being promptly updated.

8. The method of claim 5 wherein said rules are updated after predetermined time periods.

9. The method of claim 5 wherein said rules are updated after a predetermined number of system accesses.

10. The method of claim 1 further comprising the step of:

preventing said particular types of system access.

11. A method of controlling system access by using rules, the method comprising the steps of:

determining via a computerized induction process, properties of database queries which result in high resource utilization retrieving data from a database;

generating, in response to said step of determining, a set of rules to prevent queries which have said properties;

filtering said rules through a computer program to determine if any of said rules are inapplicable; and discarding in response to said filtering step at least one of said rules which requires that a query having said property should not be allowed.

12. A method of controlling system access comprising:

forming a set of rules which govern whether particular transactions in said system will or will notbe permitted;

weighing rules depending upon system conditions, several of said rules potentially conflicting with each other; and applying a weighted average of the rules to determine if system access will be permitted.

13. A method of controlling access to a multi-user computer system comprising the steps of:

(a) modeling a database contained in said computer;

(b) determining, from said step of modeling, database queries which will generate excessive loading;

(c) ascertaining, after database queries which generate excessive loading are transacted, additional queries which generate excessive loading and which where not determined in step (b); and (d) controlling access to said system by rules based upon both said step of ascertaining and said step of determining.

14. The method of claim 12 wherein at least two of said steps a–d are performed on a computing device other than said computer.

15. The method of claim 13 wherein excessive loading includes one or more of the following: (i) CPU time, (ii) elapsed time, (iii) bandwidth, and (iv) number of items retrieved.

16. A method of forming rules to govern and control data access to a database, said method comprising:

recording the occurrence of a first transaction at a first time;

recording the occurrence of a second transaction at a second time;

preventing specified future data accesses to said database if said first and second times have a predetermined relationship with each other with respect to time and substance.

17. A method of updating rules in a computer system, said computer system having a plurality of clients, said method comprising:

applying, at least one of said clients, rules to objects contained within said clients;

collecting results of said applications at said at least one of said clients of said rules to said objects said results being organized into samples;

updating rules based upon said samples; and applying said updated rules to said objects at each of said at least one of said clients.

18. The method of claim 17 wherein said step of collecting comprises the step of transmitting samples to a central server.

19. The method of claim 17 or 18 wherein said step of updating comprises the step of utilizing a learning engine.

20. The method of claim 19 further comprising the steps of maintaining, at said central server, a database of all samples, and utilizing samples regarding a particular object to update rules governing such particular object types.

21. The method of claim 18 wherein said object is a database query.

22. The method of claim 21 further comprising the steps of maintaining, at said central server, a database of all samples, and utilizing samples regarding a particular object to update rules governing such particular object types.

23. The method of claim 21 wherein said rules are designed to prevent database queries from generating results with more than a predetermined amount of data.

24. The method of claim 18 further comprising the steps of maintaining, at said central server, a database of all samples, and utilizing samples regarding a particular object to update rules governing such particular object types.

25. The method of claim 18 wherein any client which transmits a sample to said central server is automatically scheduled to receive updates to rules governing objects of a type corresponding to objects within said sample.

* * * * *